(12) United States Patent
Sansone

(10) Patent No.: US 6,415,336 B1
(45) Date of Patent: Jul. 2, 2002

(54) ELECTRONIC INDICIUM AND METHODS OF USING SAME IN POSTAL PROCESSES

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/236,773

(22) Filed: Jan. 25, 1999

(51) Int. Cl.[7] .......................... G06F 13/00; G08B 13/14
(52) U.S. Cl. .......................... 710/5; 705/401; 705/408; 705/410; 340/572.7; 340/572.8
(58) Field of Search .............................. 710/5; 705/401, 705/408, 410; 340/572.7, 572.8

(56) References Cited

U.S. PATENT DOCUMENTS

| | | | |
|---|---|---|---|
| 5,153,842 A | 10/1992 | Dlugos et al. | 700/227 |
| 5,684,705 A | 11/1997 | Herbert | 705/401 |
| 6,026,385 A | * 2/2000 | Harvey et al. | 705/408 |
| 6,130,613 A | * 10/2000 | Eberhardt et al. | 340/572.7 |

FOREIGN PATENT DOCUMENTS

EP        0788075        * 1/1997

OTHER PUBLICATIONS

Smartcards become an International Technology, pp. 134–140, James J. Farrell III, Motorola.*

* cited by examiner

Primary Examiner—Jeffrey Gaffin
Assistant Examiner—Tammara Peyton
(74) Attorney, Agent, or Firm—Ronald Reichman; Angelo Chaclas

(57) ABSTRACT

An electronic indicium to be affixed to a mailpiece to be processed by a postal meter and an AFCS unit, and methods of using the electronic indicium in postal processes. The indicium includes a controller, a memory for storing postal funds and postal information, a sensor and transmitter for communicating with an external device, a display unit capable of forming a visible FIM symbol and a cancellation mark when required. Preferably, the indicium also includes means for receiving and storing power from an external source. The FIM is activated when the meter transfers postal fund into the memory. The FIM is canceled when the mailpiece is processed in the AFCS unit and postal fund is removed from the memory. The method of using electronic indicia in postal processes involves the steps of transferring funds and downloading postal information from the sender's meter to the indicia, the reading of the funds and information in a post office, and the cancellation of the FIM.

19 Claims, 9 Drawing Sheets

ELECTRONIC INDICIUM AND METHODS OF USING SAME IN POSTAL PROCESSES

TECHNICAL FIELD

The present invention relates to a postage indicium and, more specifically, a postage indicium that can be programmed to store information therein.

BACKGROUND OF THE INVENTION

Currently, one can mail a letter or a package through the U.S. Postal Service (hereafter referred to as USPS) and other posts using postage stamps or postage indicia. In either case, the sender prepays for the mailing services. In using postage indicia, the sender usually uses a postage meter certified by the USPS (or the government post for other countries) to issue a postage indicium according to the weight of the mailpiece, the destination, and the chosen services. The meter will print on the indicium the paid postage amount, the indicium issuance date and location, the meter n umber, and a postal service symbol.

Current postal processing technology still contains many labor, time, and cost consuming processes for both the USPS and the sender. For example, if a metered mailpiece is damaged, the sender must submit the mailpiece envelope along with proof of the mailing to the entry post office. Forms must also be filled out by both parties before a portion of the paid amount is r e turned to the sender. Moreover, in accordance with the current practices of the USPS, the sender will not get a refund even if a time-sensitive mailpiece is not delivered within the contracted time. For example, if an overnight delivery package does not arrive the next day, the recipient must file a claim for a refund for not receiving the service specified. The sender will not receive a refund. Furthermore, the USPS currently hand enters the 5 digit ZIP code for each mailpiece to be delivered so as to produce a special bar coded label to be attached to the mailpiece. All these processes cost the mailer and the post both time and money. It is desirable to have a smart device to reliably store postal information so that the time and cost for processing mail can be reduced.

In the past, smart devices for storing postal information have been disclosed. For example, U.S. Pat. No. 5,684,705 (Herbert) discloses a mail item including a smart device for storing data relating to postal information. The smart device is used by a user to enter data therein and to account for postage charge used. The postal authority can also use the data recorded in the smart device to handle the mail item from a mail receiving station to its destination address and to track passage of the item to its destination. However, the smart device as disclosed does not also provide visible markings recognizable by human operators or postal processing machines, nor does it conform to the current practices by the USPS.

It is advantageous to provide a mail item, such as a new type of postage indicium, to eliminate or reduce the above-mentioned costly steps. More important, the new postage indicium, preferably, conforms to the current practices by the USPS.

SUMMARY OF THE INVENTION

It is the primary objective of the present invention to provide an electronic indicium for postal uses wherein the indicium can be programmed to store relevant postal information and to provide visible markings recognizable by human operators and postal processing machines.

It is another objective of the present invention to provide a process of cash flow between the sender and the post wherein a programmable electronic device is used for storing postal information.

The electronic indicium, according to the present invention, includes an electronic processing unit or controller, a memory and means for communicating with external devices. Preferably, the controller is powered by an external power source in a remote, or non-contacting, fashion, and the controller is capable of effecting the production of a FIM (Facer Identification Mark) symbol and a postage cancellation symbol. More specifically, it is preferable that the electronic indicium includes a Radio Frequency (RF) power pickup circuit to receive electrical power provided by an external RF source, an energy storage component, such as one or more capacitors, to energize the controller and other electronic components in the indicium when needed. Moreover, the electronic indicium includes an optical sensing unit to receive information embedded in optical signals, and an optical signal transmitter for sending out information. Preferably, the memory comprises a read/write memory to store meter number, funds for postage, data, time, type and level of services, destination and other relevant service codes, and an optional fixed-program memory to store vendor information and services. Preferably, the electronic indicium is designed to conform with the USPS requirements as specified in the Domestic Mail Manual (DMM), and it can be used in conjunction with existing postage meters and other postal processing equipment with minimal modification. For example, the postal AFCS (Automatic Facer Canceller System) unit and the postal DBCS (Delivery Bar Code Sorter) unit can be modified to include an optical sensor and an optical transmitter to read information from and write information to the indicium memory, and a RF source to activate the controller in the indicium. Also, a postage meter can be modified to include a similar optical signal transmitter and an optical sensor for establishing a two-way communication channel to communicate with the indicium, and an RF source to energize the indicium.

The present invention will become apparent upon reading the description of the drawings.

DETAILED DESCRIPTION

Figure 1:
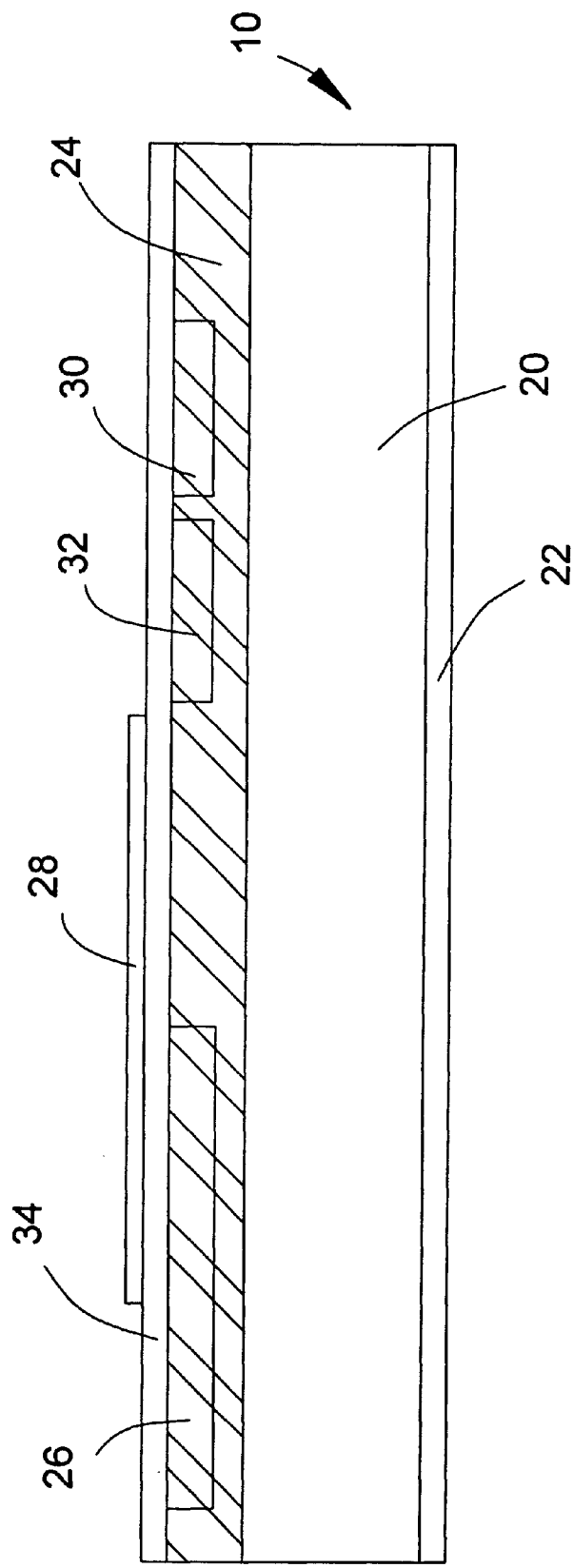
FIG. 1 illustrates the cross section of the electronic indicium, according to the present invention.

FIG. 1 illustrates the cross section of an electronic indicium. As shown in FIG. 1, the indicium 10 is produced on a thin substrate, such as a paper layer 20, which, preferably, has an adhesive layer 22 for affixing the indicium to a mailpiece. The indicium also includes an electronic material layer 24 to contain all the necessary electronic components, and a composite window layer 34 which may also serve as a protective layer to the electronic material layer. Preferably, the electronic components in the electronic material layer 24 are made from an amorphous semiconductor material. Contained in the electronic material layer 24 adjacent the composite window layer are a sensor 32 and a signal transmitter 30 to allow the indicium to communicate with external devices. Preferably, the indicium also include means 26 for producing a FIM, postage cancellation mark, and other visible markings recognizable by human operators and/or postal processing machines. Furthermore, it is preferable that indicium 10 has invisible markings 28 produced from dual luminescent ink to produce both fluorescent and phosphorescent light under the exposure of UV radiation, so that electronic indicium 10 can be recognized by an AFCS unit. Currently, an AFCS unit uses a UV source to distinguish postage stamps which produce phosphorescent light from regular postage indicia which have fluorescent markings.

Figure 2:
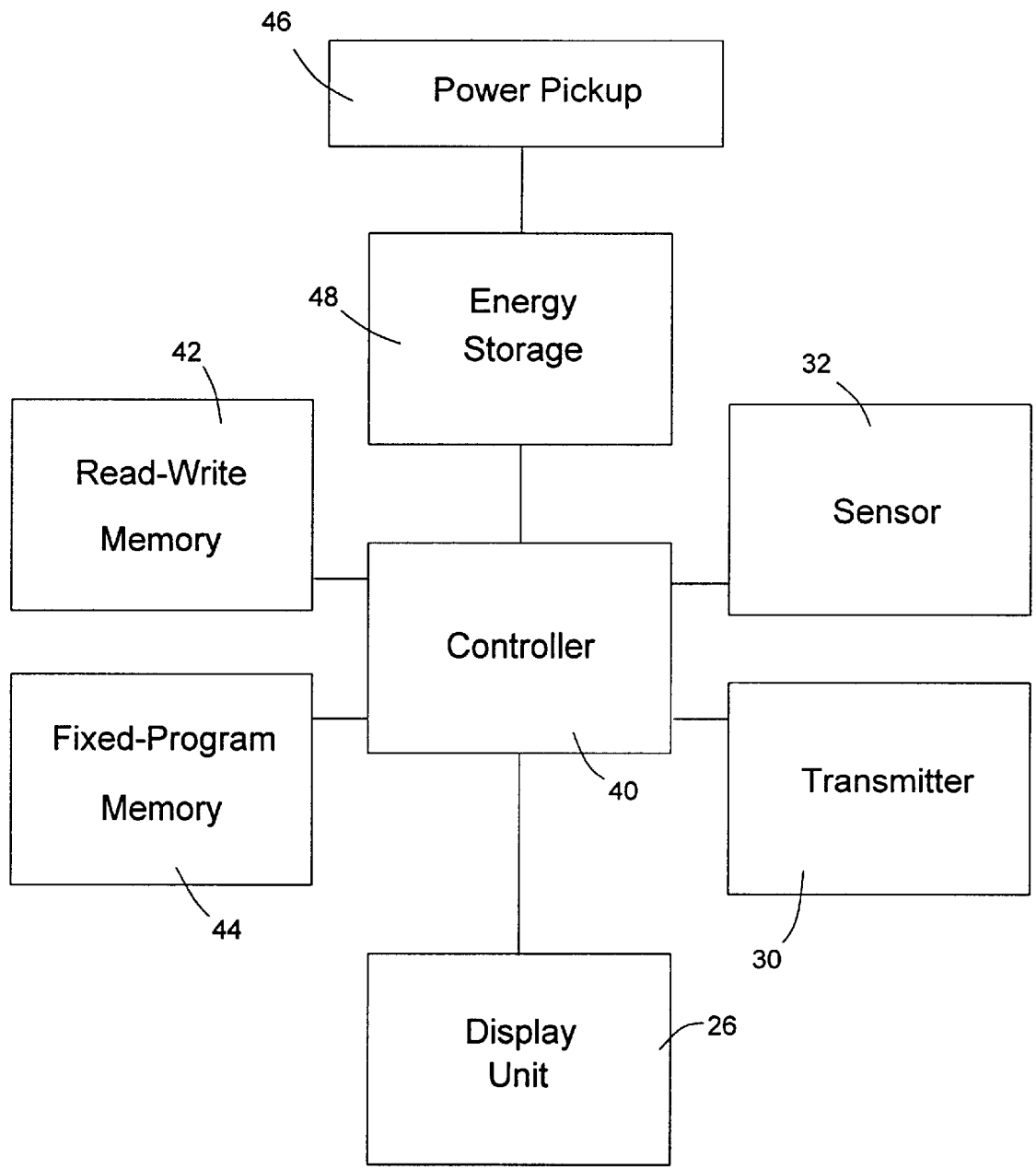
FIG. 2 illustrates the electronic components included in the electronic indicium.

FIG. 2 illustrates the electronic components included in the electronic indicium. As shown, the indicium includes a processing unit or controller 40, a read/write memory 42 for storing postage fund amount, date, time, meter number, weight, level of services, destination and other service codes, an optional fixed-program memory 44 for storing vendor information. But vendor information can also be stored in the read/write memory 42. The indicium also includes a sensor 32 to receive information from an external device and a transmitter 30 to send out information. Preferably, sensor 32 is an optical sensor for receiving optical signals, and it may comprise an optical filter for noise filtering. Transmitter 30 may comprise one or more solid state light sources such as LEDs to provide optical signals. It is preferred that the electronic indicium is activated only when it is in the proximity of a postal processing machine such as a postage meter or an AFCS unit. Thus, it is preferable that the electronic indicium comprises a power pickup unit 46 to receive power from an external RF source or other power sources, and an energy storage means 48 to provide power to controller 40, display unit 26, sensor 32, transmitter 30, and the memory units. Energy storage means 48 may comprise one or more capacitors, and voltage controlling means. Display unit 26 is used to produce a FIM symbol, postage cancellation mark and other visible markings. It is preferred that display unit 26 comprise an electrophoresis material so that it can activated to form visible and permanent patterns. For example, display unit 26 may comprise electrodes arranged in stripes to produce a visible FIM symbol or a postage cancellation mark. It is understood that the electrodes are controllable by controller 40 so that the visible patterns are only produced when required. The postage cancellation mark can be produced with an electrophoresis material, but it can also be produced with a heat-sensitive dye which turns into a darker tone when subject to high temperature, or with two-tone magnetic particles which can be aligned with an external magnetic field. Display unit 26 can also be used to produce a barcode or OCR readable form to show a tracking number.

Figure 3:
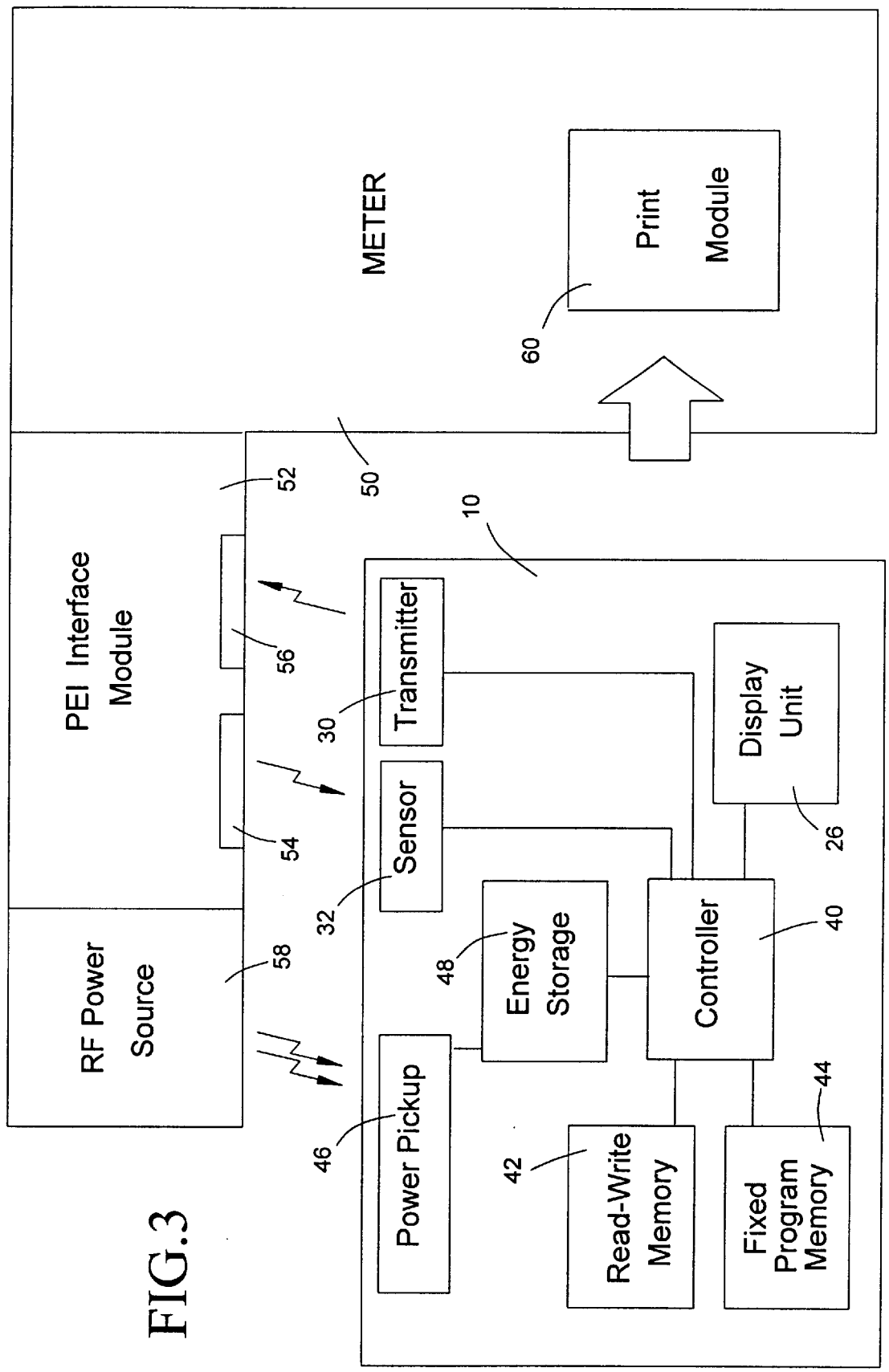
FIG. 3 illustrates the interaction between a postage meter and an electronic indicium.

FIG. 3 illustrates the interaction between a postage meter and an electronic indicium on a mailpiece. As shown in FIG. 3, a regular postage meter 50 is adapted to include a programmable electronic indicium (PEI) interface module 52 and a power source 58. It is preferable that power source 58 is a RF source for providing energy to indicium 10 when the latter is in the proximity of meter 50. PEI interface module 52 comprises a modulated light source 54 for transmitting information to controller 40 via sensor 32, and a receiver 56 for receiving information from controller 40 via transmitter 30. Print module 60 is used to produce visible face service markings such as postage paid, meter number, services selected, and so forth, on the mailpiece. As the mailpiece is processed by the postage meter, the meter communicates with the electronic indicium, and writes to read/write memory 42 the amount of postage paid, date and time of data entry, meter number, and other postal related information. The meter also debits its internal register memory for the postal funds for postage, plus other service fees. At the same time, the meter commands the controller 40 to activate the display unit 26 to produce a visible and permanent FIM symbol. The print module 60 also prints face service markings on or near the indicium. An example of the face service markings is shown in FIG. 7b by reference numeral 144.

Figure 4A:
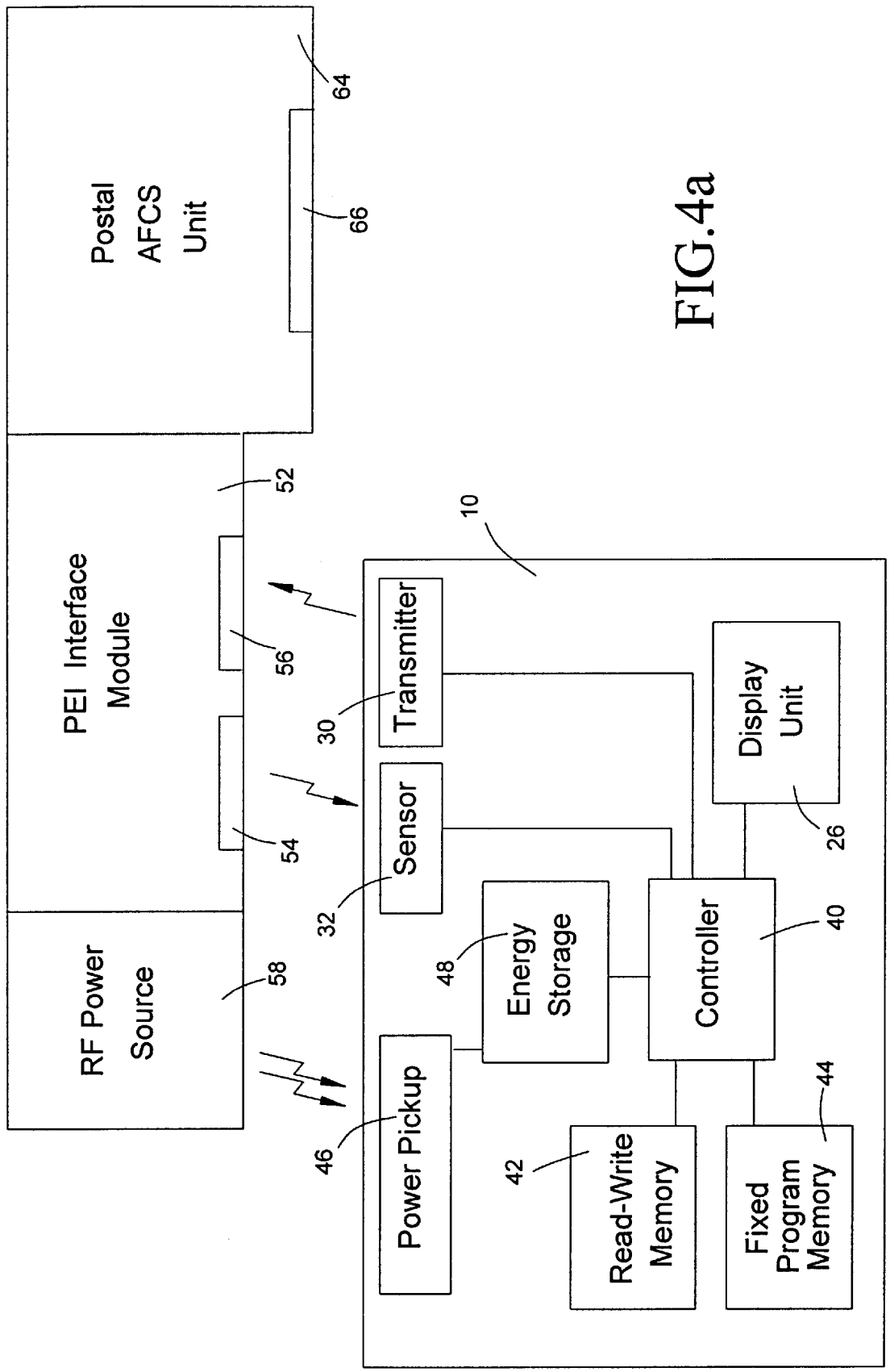
FIG. 4a illustrates the interaction between a postal AFCS unit at an entry post office and an electronic indicium.

FIG. 4a illustrates the interaction between a postal AFCS unit at an entry post office and an electronic indicium on a mailpiece. As shown in FIG. 4a, a postal AFCS unit 64 has a UV source 66 to cause the emission of fluorescent and phosphorescent light. The AFCS unit is adapted to include a PEI interface module 52 having a transmitter 54 and a receiver 56 for communicating with the electronic indicium 10, and a power source 58 to activate the indicium when the latter is in the proximity of the AFCS unit. The UV source 66 is used to identify whether the incoming mailpiece has postage stamps (phosphorescent), regular indicia (fluorescent) or electronic indicia (phosphorescent and fluorescent) affixed thereon. After the AFCS unit has identified the FIM symbol on the electronic indicium, it retrieves information stored in the read-write memory 42. If the information stored in the memory indicates that the mailpiece is a one-way regular mail and is not time-sensitive, the AFCS commands the controller to effect the cancellation of the FIM, producing a visible cancellation mark over the FIM symbol. Furthermore, if necessary, the AFCS commands the controller to permanently disable the FIM so that the "canceled" indicium cannot be reused. An example of the "canceled" electronic indicium is shown in FIG. 7c. However, if the mailpiece is intended for two-way outbound/inbound services, the FIM will not be canceled on the outbound route. Similarly, if the mailpiece is intended for time-sensitive services, the FIM will not be canceled by the AFCS unit at the entry post office. For a time-sensitive mailpiece, it is necessary to compute the time difference between the mailpiece being processed at a postage meter and the mailpiece being processed at a delivery or exiting post office. Thus, the FIM will be canceled by an DBCS unit at the exiting post office, as shown in FIG. 4b.

Figure 4B:
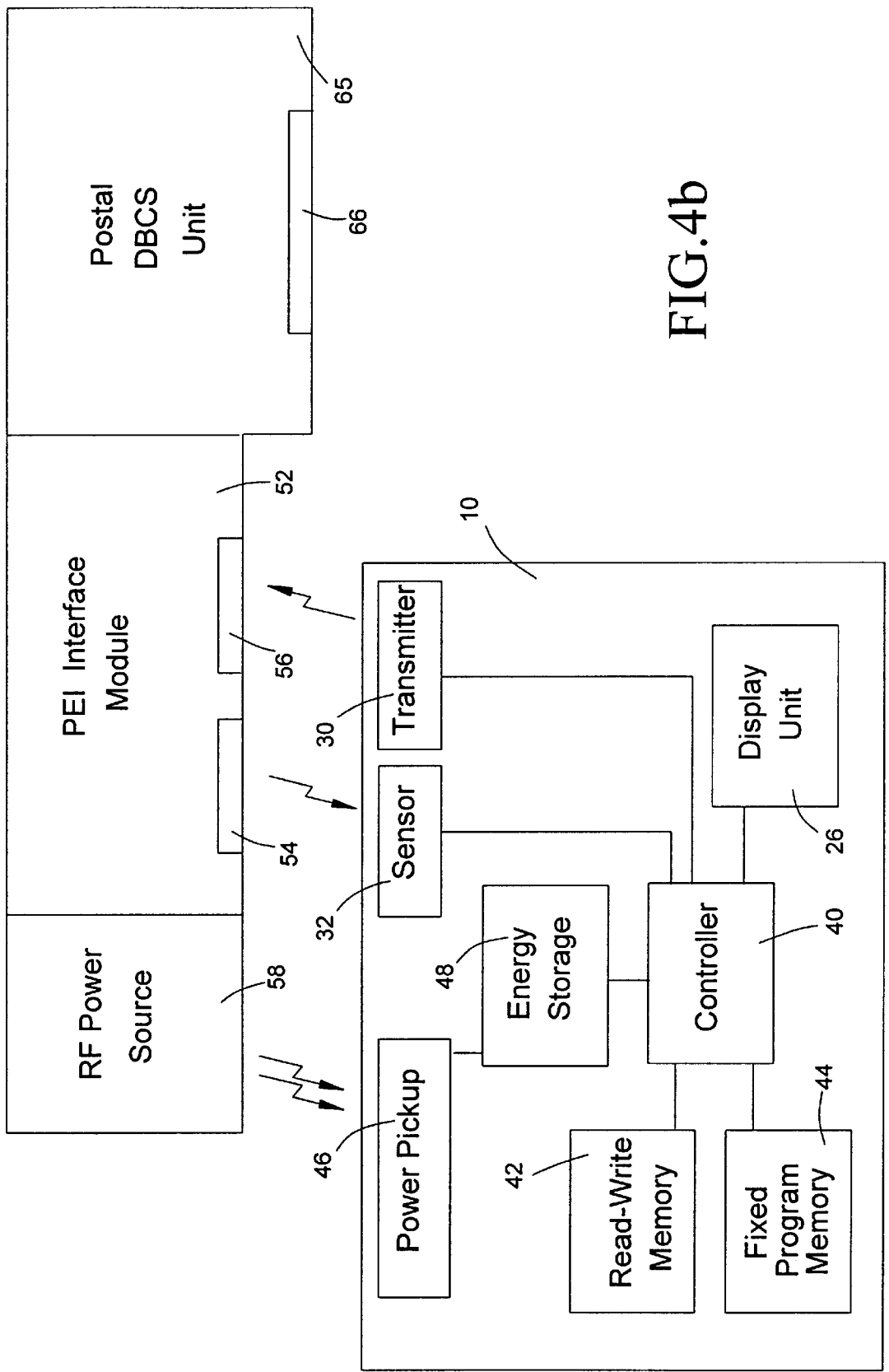
FIG. 4b illustrates the interaction between a postal DBCS unit at an exiting post office and an electronic indicium.

FIG. 4b illustrates the interaction between a postal DBCS unit at an entry post office and an electronic indicium on a mailpiece. Like the AFCS 64 unit shown in FIG. 4a, the postal DBCS unit 65 shown in FIG. 4b also has a UV source 66 to detect fluorescent and phosphorescent light and is adapted to include a PEI interface module 52 having a transmitter 54 and a receiver 56 for communicating with the electronic indicium 10, and a power source 58 to activate the indicium when the latter is in the proximity of the DBCS unit. The DBCS unit accepts all the mail processed by the AFCS unit at the entry post office. The DBCS will allow all the mailpieces that have a postage cancellation mark to pass through without further processing. For the mailpieces that do not have a postage cancellation mark on their indicia, the DBCS unit will sort out those intended for time-sensitive services. In order to determine whether the time-sensitive mail can be delivered within a contracted time, it is necessary to compute the time difference between the time of entry at the DBCS unit and the time of entry by the postage meter. It should be noted that it may also be necessary to record the time of entry at the entry post office to make sure that there is no unreasonable delay between the time of entry by the meter and the time of entry at the entry post office. The time difference must also include the time remaining for the mailpiece to reach its destination. If the contracted time can be met, then the DBCS commands the controller to effect the cancellation of the FIM. If the contracted time is not met, the sender is credited a portion of the postal funds paid. The FIM on the indicium is also canceled before the mailpiece is delivered to the receiver.

Figure 5A:
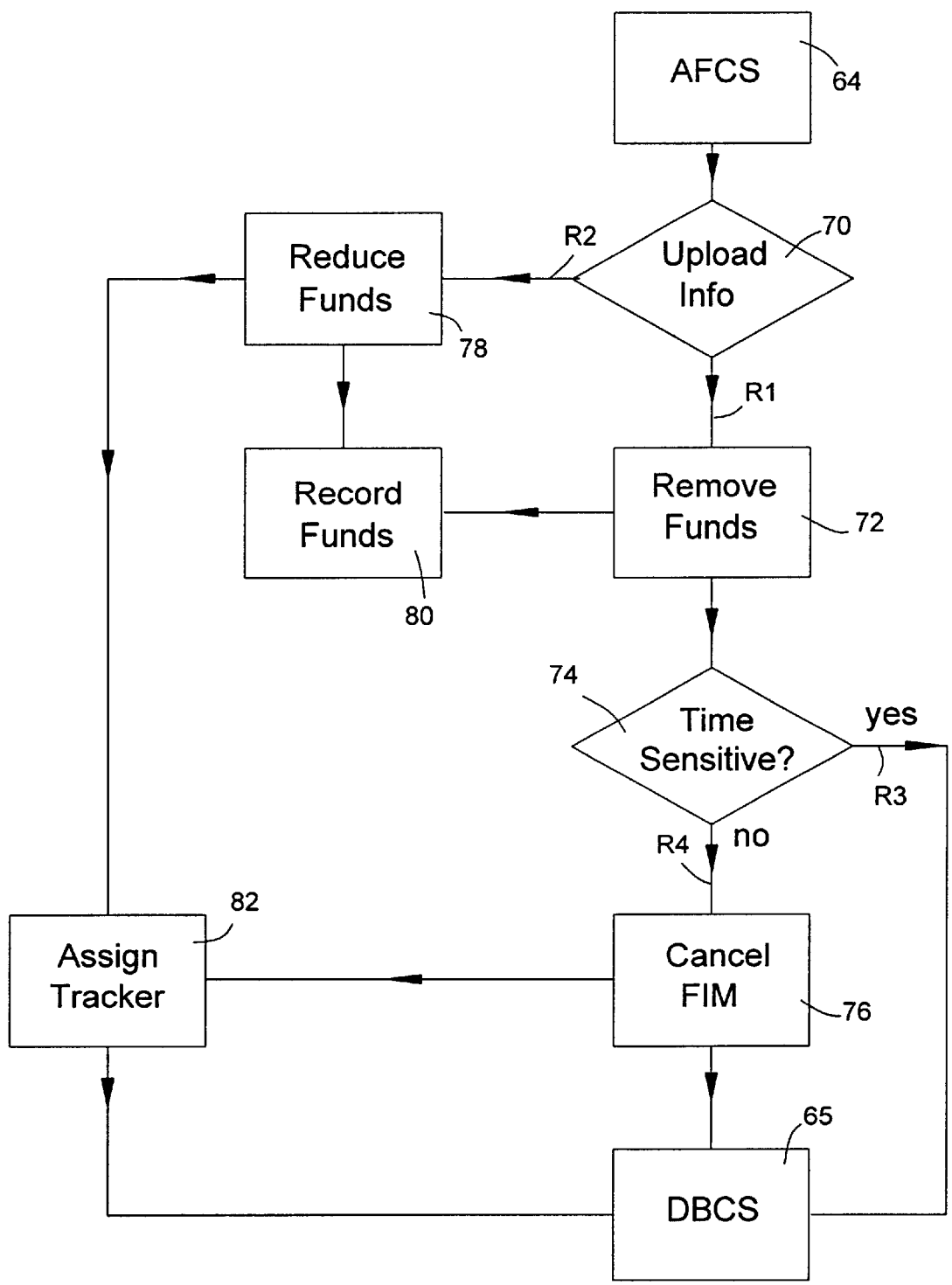
FIG. 5a illustrates a typical postal entry process at an AFCS unit.

FIG. 5a illustrates a postal entry process at an AFCS unit involving an electronic indicium. As shown in FIG. 5a, when an mailpiece bearing an electronic indicium enters an AFCS unit 64, the controller in the indicium is activated and the stored information in the indicium memory is retrieved in step 70. The stored information includes, for example, the total postage paid, the meter number, the services chosen, the date and time of entry by the postage meter, ZIP code or ZIP+4. The information may also include the weight of the mailpiece and the automation rate (per DMM). The AFCS unit determines whether the mailpiece is intended for one-way delivery or for two-way services. If the mailpiece is intended for one-way delivery, then the process is routed through path R1 and the stored funds in the indicium are removed in step 72. At this point, the AFCS unit determines whether the mailpiece is time-sensitive in that the mailpiece must be delivered within a contracted time. If the mailpiece is time-sensitive, the process is routed through path R3 to a DBCS unit 65. If the mailpiece is not time-sensitive, the AFCS commands the cancellation of the FIM on the indicium in step 76 (path R4) and the mailpiece is routed to the DBCS. If the mailpiece is paid for a two-way service, then the process is routed through path R2 where the outbound portion of the postal fund is removed in step 78. Preferably the funds removed in step 72 and step 78 are recorded in a local postal vault in step 80 for accounting purposes. It is also preferable to assign, in step 82, a tracking number to the current mailpiece and download it to the indicium. A the same time, a barcode symbol or an OCR readable code may be produced in the display unit of the indicium. This would eliminate the need for the manual postal assignment of a tracking number. All the mailpieces that enter the AFCS unit will be further processed by the DBCS unit at the exiting post office as shown in FIG. 5b.

Figure 5B:
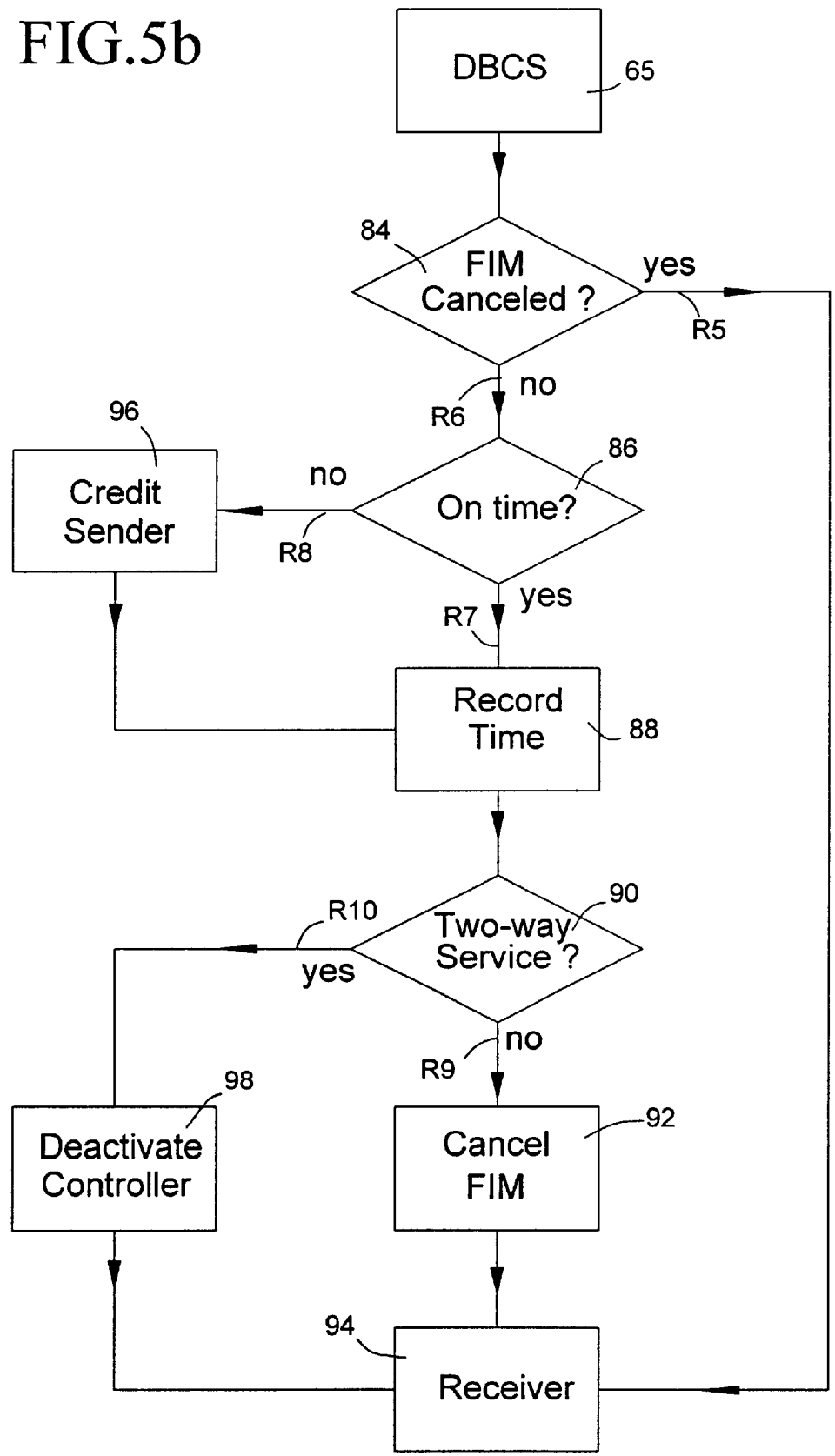
FIG. 5b illustrates a typical post process at an DBCS unit.

FIG. 5b illustrates the postal process at an DBCS unit involving an electronic indicium. As shown in FIG. 5b, the DBCS unit 65 looks for the FIM symbol on the electronic indicium affixed on a mailpiece. If the FIM has been canceled, the mailpiece is ready to be delivered to the receiver 94 (path R5). Otherwise, the process is routed through path R6 in order to determine whether the contracted time can be met. Here the time difference between the time of entry at the postage meter and the time of entry at the DBCS is computed. It should be noted that it may also be necessary to record the time of entry at the AFCS unit to make sure that there is no unreasonable delay between the time of entry at the meter and the time of entry at the AFCS unit. The time difference also takes into account the time remaining for the mailpiece to reach the receiver 94. If the contracted time is met, the process is routed through path R7 for further processing. If the contracted time cannot be met, the process is routed through path R8 so that part of the paid postage is refunded to the sender in step 96. It is preferred that the DBCS downloads its ID number, date and time of processing onto the indicium memory in step 88. In step 90, one-way mailpieces are sorted and routed through path R9 where the FIM is canceled in step 92. For a two-way mailpiece, no further process is necessary except for the deactivation of the controller in the indicium in step 98 before it is delivered to the receiver 94.

Figure 6:
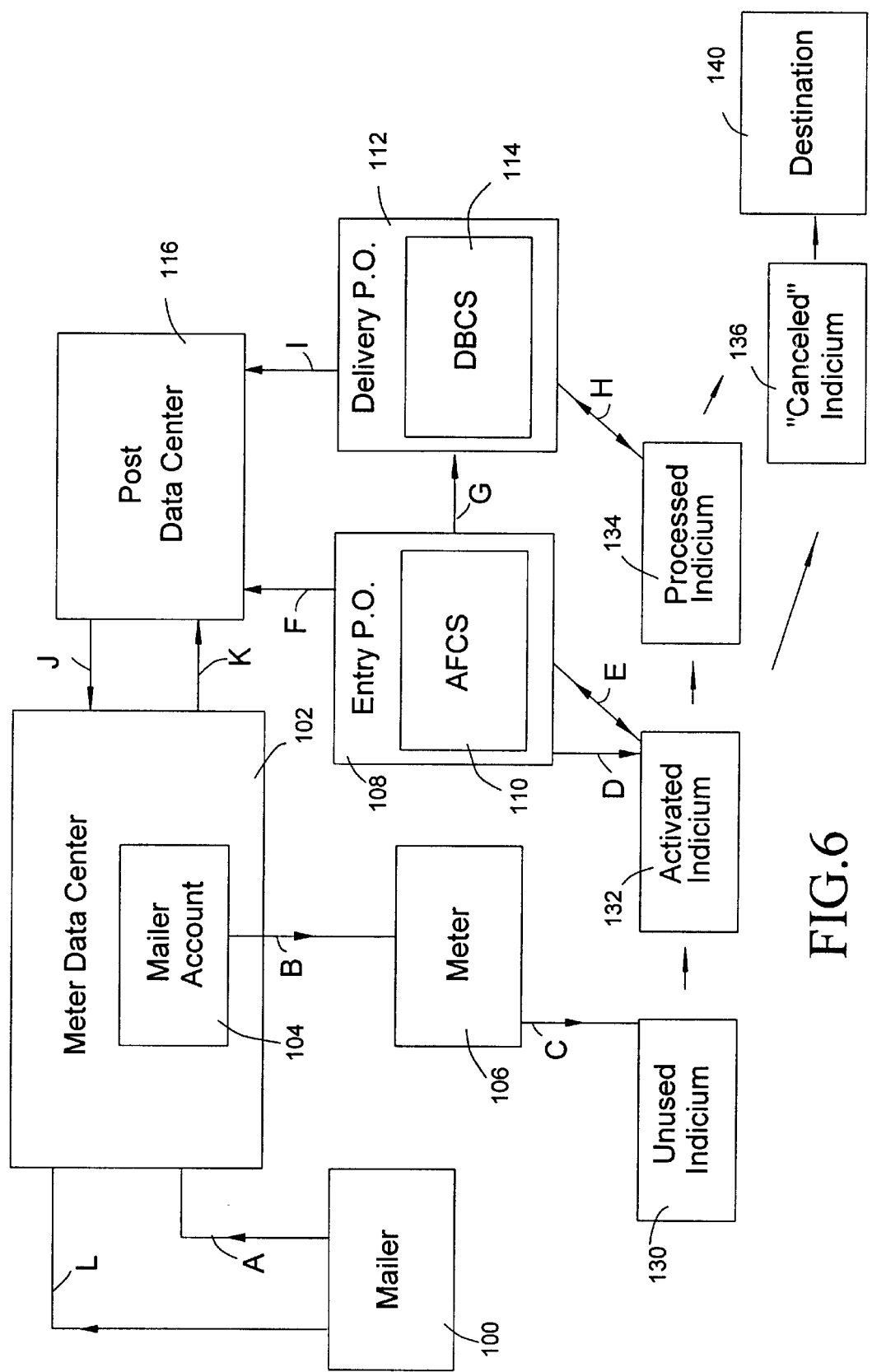
FIG. 6 illustrates a cash flow process for postal services involving an electronic indicium or a similar electronic device.

The electronic indicia, according to the present invention, offer a new type of cash flow process for postal services. As shown in FIG. 6, the cash flow process for postal services includes the following steps:

A) funds (in forms of checks, wire or credit cards) are transferred from a mailer or sender 100 into a Meter Data Center 102 where the funds are further transferred to a mailer account 104. These funds can be used for conventional metering or to pay for the new electronic indicia to be affixed on a mailpiece.

B) funds are transferred from the mailer account 104 to a postal meter 106.

C) funds are transferred from the meter register to the memory of an unused indicium 130. Other postal information is also downloaded onto the indicium. The FIM is activated and the indicium becomes an activated indicium 132. Visible face service markings are also imprinted on the mailpiece.

D) an AFCS unit 110 at an entry post office 108 identifies the electronic indicium from the dual luminescent markings.

E) the stored information in the indicium is retrieved by the AFCS which also removes funds from the memory of the indicium 132. Furthermore, the AFCS records its ID number, date and time of entry into the indicium memory. This further processed indicium is denoted by numeral 134. If the mailpiece is not time-sensitive, the AFCS triggers the indicium to cancel the FIM and render the indicium non-usable. The canceled indicium is denoted by numeral 136.

F) data retrieved from the indicium are transmitted to a Postal Data Center 116 where they are used as "proof" of entry. In the case where additional services have been paid for, the AFCS also retains a record of the mailpiece at the Postal Data Center 116.

G) mailpieces processed at the AFCS are passed through an internal route to a DBCS unit 114 in a delivery or exiting post office 112.

H) while mailpieces bearing a canceled FIM will pass through the DBCS without further processing, time-sensitive mailpieces bearing a FIM symbol (not canceled) are processed by the DBCS unit, which computes the time difference between the entry time by the postage meter 106 and the entry time at the DBCS unit 114 to determine if the services have been properly delivered from the computed time difference, plus the time remaining for the mailpiece to get to its destination 140. If the contracted time is not met, a refund is properly credited. The FIM of mailpieces processed by the DBCS is canceled.

I) a record is made for the credited amount, and the record is sent to Postal Data Center 116.

J) the Postal Data Center forwards the data record to the Meter Data Center 102 along with a credit for failed services.

K) inquiries concerning funds and/or mail tracking are sent by the Meter Data Center to the Postal Data Center.

L) records showing the final status of all mailing involving electronic indicia are consolidated and sent to the mailer.

Figure 7A:
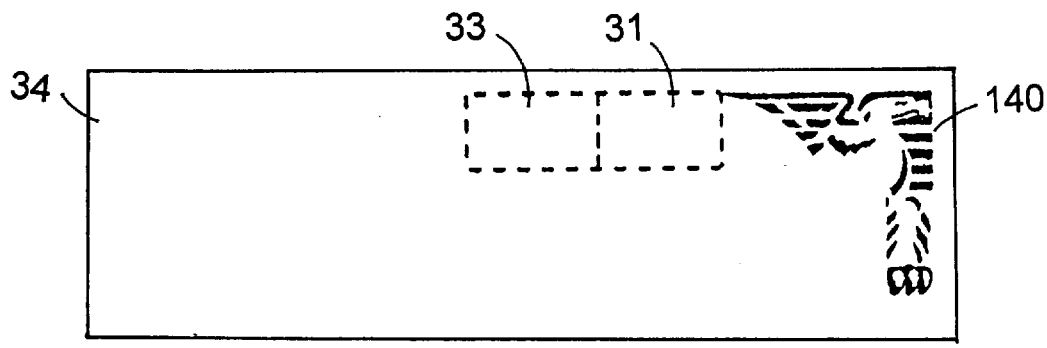
FIG. 7a to FIG. 7c illustrates examples of the electronic indicia.
Figure 7B:
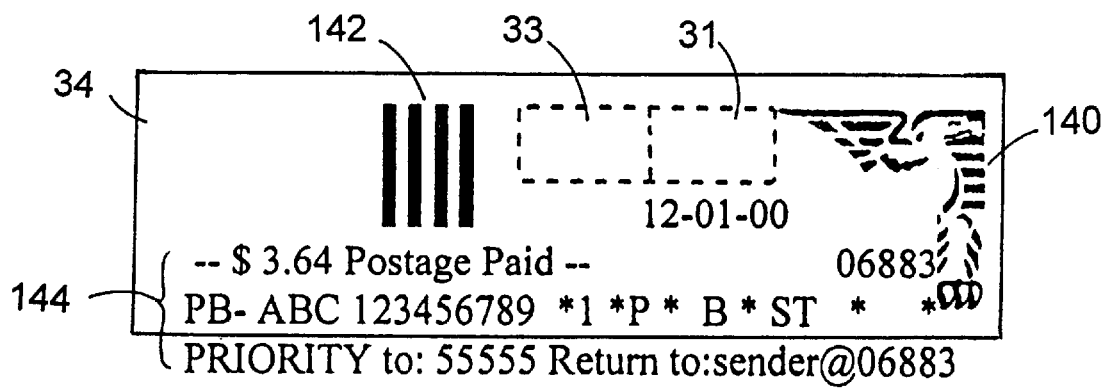
Figure 7C:
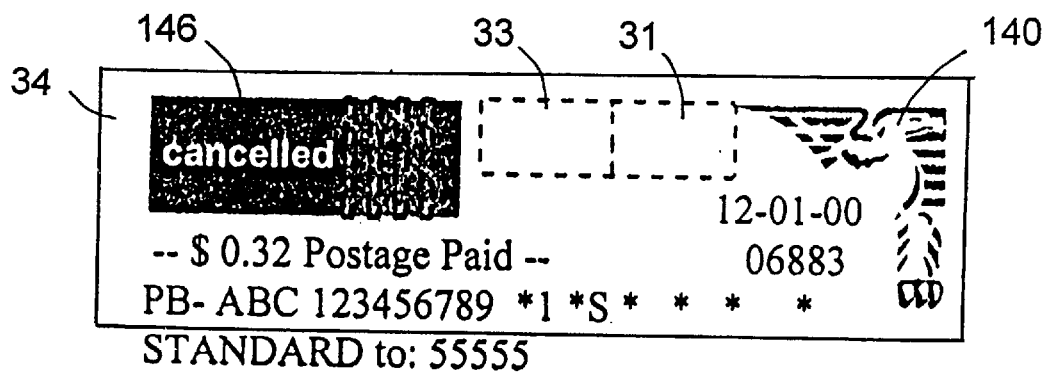

FIG. 7a illustrates an unused electronic indicia, showing the composite window 34 thereof. On the composite window, there are two clear areas 31 and 33, for exposing the transmitter and the sensor of the indicium (see FIG. 1 and FIG. 2). Preferably, a postal symbol 140 is preprinted on the top of the window layer 34.

FIG. 7b illustrates an activated indicium. As shown, a visible FIM symbol 142 has been produced on the indicium. Also shown in FIG. 7b are indicia face service markings, collectively denoted by numeral 144. The face service markings, from top down, include date (12-01-00) and entry ZIP (06883), postal funds in the indicium ($3.64), meter number (PB-ABC 123456789), weight of the mailpiece (1), services chosen (P, BR, ST), service level (PRIORITY), outbound destination (55555) and return or inbound destination (06883). These indicia face service markings are printed by a print module in a postage meter (see FIG. 3) on the mailpiece, on or near the surface of the indicium.

FIG. 7c illustrates a "canceled" indicium. As shown, a cancellation mark 146 is produced to deface the FIM symbol, rendering the indicium nonusable.

Although the invention has been described with respect to a preferred embodiment and version thereof, it will be understood by those skilled in the art that the foregoing and various other changes, omissions and deviations in the form and detail thereof may be made without depart from the spirit and scope of this invention.

What is claimed is:

1. An electronic device to be used as a metered postage indicium on a mailpiece for postal processing comprising:
   a) a substrate;
   b) an electronic layer above the substrate for forming electronic components comprising a controller for controlling the components, a read write memory for storing postal information including variable postal fund amounts, an electronic display unit for producing variable visible markings, signal sensing means and signal transmitting means for communicating with an external device;
   c) a composite window layer formed on the top portion of the electronic layer; and
   d) human-readable printed postage meter data that is printed on top of the window layer, wherein the printed postal meter data comprises postal funds stored in the read/write memory.

2. The device as claimed in claim 1 wherein the electronic layer comprises an amorphous semiconductor material.

3. The device of claim 1 wherein the composite window layer includes identification marker printed with dual luminescent ink for identification purposes.

4. The device of claim 1 wherein the composite window layer includes a top surface imprinted with a postal symbol.

5. The device of claim 1 wherein the composite window layer includes clear areas for allowing the signal transmitting means and sensing means to expose to light for communication purposes.

6. The device as claimed in claim 1 wherein the electronic layer further comprises a fixed program memory for storing fixed-program information.

7. The device as claimed in claim 1 wherein the electronic layer further comprises means for receiving external power, and energy storing means for storing the received power and for energizing the controller, the first memory, the display unit, the signal sensing means and the signal transmitting means.

8. The device as claimed in claim 1 wherein signals transmitting means comprises at least one solid state light source.

9. The device as claimed in claim 1 wherein the display unit comprises means for forming a FIM symbol and a cancellation mark.

10. The device as claimed in claim 9 wherein the FIM symbol is produced with an electrophoresis material.

11. The device as claimed in claim 9 wherein the formation of the FIM symbol is effected by the controller.

12. The device as claimed in claim 1, wherein the display unit comprises means for producing a tracking number to track the mailpiece.

13. The device as claimed in claim 1, wherein the printed postal meter data comprises:

the date the markings were affixed to the composite layer.

14. The device as claimed in claim 1, wherein the printed postal meter data comprises:

an entry zip code.

15. The device as claimed in claim 1, wherein the printed postal meter data comprises:

meter number.

16. The device as claimed in claim 1, wherein the printed postal meter data comprises:

weight of the mail piece.

17. The device as claimed in claim 1, wherein the printed postal meter data comprises:

postal services chosen.

18. The device as claimed in claim 1, wherein the printed postal meter data comprises:

outbound destination.

19. The device as claimed in claim 1, wherein the printed postal meter data comprises:

return destination.

* * * * *